United States Patent [19]

Kotthaus et al.

[11] Patent Number: 4,745,238

[45] Date of Patent: May 17, 1988

[54] FLOATABLE FLEXIBLE ELECTRIC AND/OR OPTICAL LINE

[75] Inventors: Alfred Kotthaus, Kuckeswagen; Lothar Nohring, Kaarst, both of Fed. Rep. of Germany

[73] Assignee: Kabelwerke Reinshagen GmbH, Fed. Rep. of Germany

[21] Appl. No.: 812,259

[22] Filed: Dec. 23, 1985

[30] Foreign Application Priority Data

Dec. 22, 1984 [DE] Fed. Rep. of Germany ....... 3447225

[51] Int. Cl.$^4$ .............................................. H01B 7/12
[52] U.S. Cl. ................................ 174/101.5; 138/111; 174/28; 174/47; 174/97
[58] Field of Search ................... 174/15 C, 24, 28, 47, 174/95, 97, 101.5; 350/96.23; 138/111, 115

[56] References Cited

U.S. PATENT DOCUMENTS

| | | | |
|---|---|---|---|
| 504,397 | 9/1893 | Marsh | 174/28 |
| 3,155,768 | 11/1964 | Garshick | 174/101.5 |
| 3,588,313 | 6/1971 | Broughton | 174/101.5 X |
| 3,699,237 | 10/1972 | Melia | 174/101.5 |
| 3,710,006 | 1/1973 | Davis | 174/101.5 |
| 4,038,489 | 7/1977 | Stenson et al. | 174/70 R |
| 4,199,224 | 4/1980 | Oestreich | 350/96.23 |
| 4,374,881 | 2/1983 | Hamilton | 174/95 X |

FOREIGN PATENT DOCUMENTS

| | | | |
|---|---|---|---|
| 162224 | 8/1905 | Fed. Rep. of Germany | 174/95 |
| 2009933 | 11/1971 | Fed. Rep. of Germany | 138/115 |
| 2056469 | 6/1972 | Fed. Rep. of Germany . | |
| 2133453 | 1/1973 | Fed. Rep. of Germany | 174/28 |
| 3005615 | 8/1981 | Fed. Rep. of Germany . | |
| 56805 | 4/1982 | Japan | 350/96.23 |
| 8005762 | 4/1981 | Netherlands | 138/115 |
| 967012 | 8/1964 | United Kingdom | 174/24 |

OTHER PUBLICATIONS

*Research Disclosure*; "All-Plastics Protective Sheathing Arrangement"; Feb. 1973 (10612).

*Primary Examiner*—Morris H. Nimmo
*Attorney, Agent, or Firm*—Reising, Ethington, Barnard, Perry & Milton

[57] ABSTRACT

A floatable flexible line is provided with at least four air chambers which extend in the form of a one-piece extruded flexible chambered casing around the conductors. The density of the material for the chambered casing is preferably below 1 kg/dm$^3$.

4 Claims, 1 Drawing Sheet

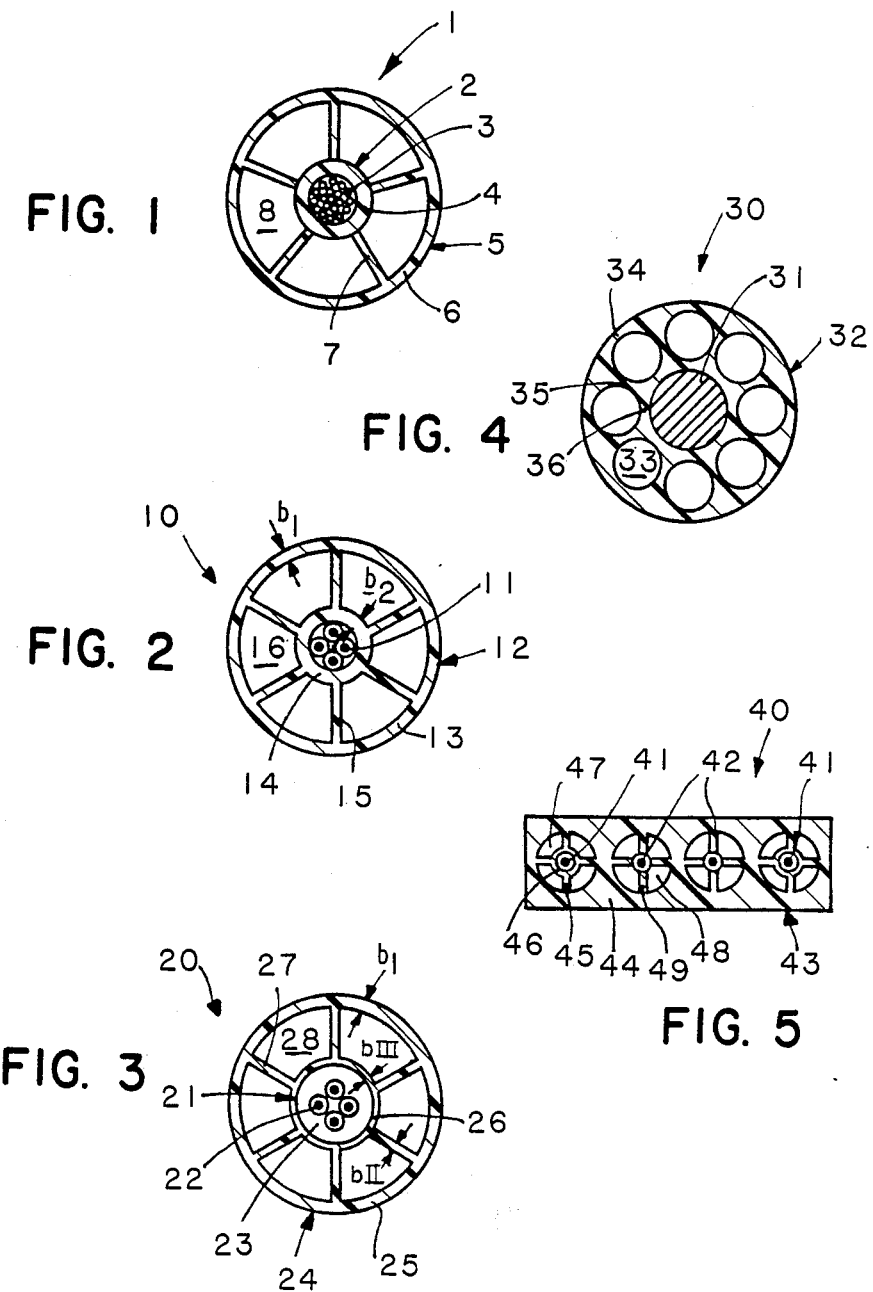

FLOATABLE FLEXIBLE ELECTRIC AND/OR OPTICAL LINE

FIELD OF THE INVENTION

The invention relates to a floatable flexible line.

BACKGROUND OF THE INVENTION

Floatable flexible electric lines have already been used in technology for a long time as for supplying electric power to water reservoir cleaning installations, to dredges and the like. Besides the method of fastening heavy rubber hose lines to pontoons or similar floating bodies, lines are also known that are rendered floatable by central cork cylinders or by central, roped-out or twisted arrangement of several air hoses (German unexamined patent specification No. OS 20 56 469). Through the use of cork cylinders, however, the line becomes relatively rigid, even if, as suggested, only short cork cylinders are provided and between them there are arranged rubber disks (German unexamined patent specification No. OS 20 56 469). The production cost is considerable, not least of all through the use of very different materials. The use of roped or wrapped air tubes is, to be sure, a usable solution, but the production expenditure is still very high, both from the process expenditure and also from the material use.

It is also a known practice to use, instead of tubes, to wrap foamed plastic bands with closed pores about a flexible support cable or to provide longitudinally running slit plastic tubes and to arrange over them a closed-pore hollow-cylindrical foamed outer casing (DE-OS 30 05 615). This construction, too, requires expensive manufacturing arrangements and leads to a slow and therefore uneconomical production of the line.

Underlying the invention is the problem of producing a floatable flexible electric and/or optical line of the type mentioned at the outset, which can be manufactured rapidly, with simple machines and with saving in material.

SUMMARY OF THE INVENTION

In accordance with this invention, a floatable flexible line is provided which is of rugged construction and lightweight with good floatation and is economical to manufacture. This is achieved by flexible one-piece casing surrounding one or more conductors, said casing including a plurality of air chambers extending longitudinally of the line. Further, according to the invention, the one-piece chambered casing comprises an outer wall and a plurality of radial walls which terminate in an inner cylindrical wall or in another embodiment, on a separate casing of the conductors. Further, the material of the chambered casing is thermoplastic material with a density of less than 1 kg/dm$^3$, preferably a density of 0.9±0.02 kg/dm$^3$. Further, according to the invention, the chambered casing may have different thicknesses of the inner and outer walls and radial walls to provide the required protection and insulation of the conductor and still maintain the desired lightweight. Further, the chambered casing may be formed in a cylindrical shape or in a flat shape. Further, according to the invention, the floatable flexible line is made by the method of extruding the chambered casing over the conductors contained therein.

A more complete understanding of this invention may be obtained from the detailed description that follows taken with the accompanying drawings.

DESCRIPTION OF THE DRAWINGS

FIG. 1 shows a first simple form of execution with a large number of individual conductors inside the hollow chamber profile.

FIG. 2 shows a second form of execution with four individual electric energy conductors.

FIG. 3 shows a third form of execution with a four-conductor, sheathed energy line.

FIG. 4 shows a fourth form of execution with an arbitrary electrical and/or optical line.

FIG. 5 shows a four-conductor flat line, in which the invention is realized.

BEST MODE FOR CARRYING OUT THE INVENTON

The encased electric or optical conductor of the floatable line can be of any desired construction; for example they can be signal or power conductors. Favorable for the requisite buoyancy of the line and also for a low volume, is an insulating and encasing material the density of which is as low as possible. For the flexible chambered casing there is used preferably a thermoplastic material which is known as so-called thermoplastic rubber (TPR) and is workable on conventional extruders. Such a thermoplastic rubber is available from Esso Chemical Limited of Southampton, England and is sold under the trademark "VISTAFLEX". Also possible, however, is the use of polyolefins, such as, for example, polyethylene or polypropylene. Finally, also other thermoplasts or elastomers are usable, for example polyvinyl chloride, polyurethane or polychlorprene, the density of which, if need be, is reduced by extremely small air inclusions of arbitrary type, for example generated by inflating agents. In the first-mentioned plastic the density lies at 0.91 kg/dm$^3$, so that inflating agents, as a rule, are not required.

With the invention there is created a line construction which is adaptable to a large variety of applications. The advantages of simple and high speed and, therefore, economic manufacture are preserved. Through the arrangement of several air chambers fully separate from one another the line is secure against sinking in water and the like, very flexible, mechanically stable and long-lived in use.

FIG. 1 shows a floatable line 1 with centrally arranged cable 2 with a large number of conductors 3, which are surrounded by an insulating casing 4. The conductors 3 can serve, for example, for the transmission of signals and can be either electrical or optical conductors. On the casing 4 an annular flexible chambered casing 5 of thermoplastic material is extruded under radial pressure. The casing 5 comprises an outer cylindrical wall 6, from which five radial walls 7 extend radially inwardly into supporting and sealing engagment with casing 4. Through suitable choice of the radial extrusion pressure the walls 7 form an airtight and liquid tight seal with casing 4 and form together with the casing 4 five air chambers 8 which extend longitudinally by of the line 1.

FIG. 2 shows a floatable line 10 with four twisted electrically insulated conductors 11 for 220 or 380 volt tension, which are arranged in the interior of a chambered casing 12. The casing 12 consists of the outer wall 13 and an inner wall 14 which are joined with one another by six radial walls 15 so that there are six air chambers. The casing 12 is extruded as a tube loosely over the conductors 11; the conductors 11, therefore, are movably supported inside the inner wall 14. The wall thickness $b_1$ of the outer wall 13 is less than the wall thickness $b_2$ of the inner wall 14, since the latter in this embodiment serves the full insulating and protective function for the conductors 11.

FIG. 3 shows a floatable line 20, with an electrical cable 21 of four insulated conductors 22, which are encased in an extruded casing 23, for example of polyvinyl chloride or rubber. The chambered casing 24 comprises an outer wall 25 and an inner wall 26 which are joined with one another by six radial walls 27, so that there are six air chambers 28. The casing 24 is extruded under radial pressure onto the casing of cable 21. The wall thickness $b_I$ of the outer wall 25 is greater than the wall thickness $b_{II}$ of the radial walls 27 which is greater, in turn, than the wall thickness $b_{III}$ of the inner wall 26: The resulting relation $b_I$, $b_{II}$, $b_{III}$ has proved to be especially advantageous. The inner wall 26 can be chosen very thin here, since the insulating and protective function is fully served by the casing 23.

FIG. 4 shows a floatable flexible line 30 with a central multi-conductor line 31, which can be of any type, for example as already described for FIGS. 1 through 3. Around the line 31 there is extruded an chambered casing 32 which includes eight air chambers 33 round in cross-section and an outer wall 34 joined with an inner wall 36 by eight radial walls 35. The round form of the air chambers 33 permits a simplified production of the die of the extruder and achieves a good cushioning of the line 30, which can be important especially in the case of great pressure strain.

FIG. 5 shows a floatable flexible line in the form of a flat line 40. The flat line 40 comprises two outboard and two inboard insulated conductors 41 and 42, respectively, which are carried by a chambered casing 43. The conductors 41 are fully surrounded by the material of the casing 43, since the body or outer wall 44 of the casing 43 is joined by radial walls 45 with an annular inner wall 46. Outer and inner walls 44 and 46 form, together with the radial walls 45, four longitudinally running annular-sector-form air chambers 47. In the case of the inboard conductors 42 there are four longitudinally running air chambers 48 bounded by the outer wall 44, radial walls 49 and the insulation on conductor 42. Besides the circular contour of the four air chambers 47 and 48, other forms are possible, which may be better adapted to the form of the flat cable 40, for example with rectangular or square contour.

Although the description of this invention has been given with reference to a particular embodiment, it is not to be construed in a limiting sense. Different modifications and variations will now occur to those skilled in the art. For a definition of the invention reference is made to the appended claims.

What is claimed is:

1. A floatable flexible line comprising a plurality of conductors and a flexible one-piece casing having an extrudable cross-section shape and comprising an inner cylindrical wall and an outer cylindrical wall with a plurality of radial walls extending therebetween, said walls being impermeable to air and liquid, said inner cylindrical wall surrounding said conductors, said walls defining a plurality of air chambers extending longitudinally of said line for providing buoyancy thereto, said casing being constructed of an extrudable thermoplastic rubber having a density of less than 1 kg/dm$^3$ for supplementing the buoyancy of said line.

2. The invention as defined in claim 1 wherein said conductors are encased in a separate casing disposed inside said inner cylindrical wall and wherein the outer cylindrical wall thickness is greater than the thickness of said radial walls which is greater than the thickness of said inner cylindrical wall.

3. The invention as defined in claim 1 wherein said flexible one-piece casing is flat and said plurality of conductors are disposed in side-by-side relationship, and wherein plural air chambers extend adjacent each of said conductors.

4. The invention as defined in claim 1 wherein said thermoplastic rubber has a density of 0.9±0.02 kg/dm$^3$.

* * * * *